US011195556B2

(12) United States Patent
    Crawford

(10) Patent No.: US 11,195,556 B2
(45) Date of Patent: Dec. 7, 2021

(54) METHOD AND SYSTEM FOR WATERMARKING VIDEO MEDIA TO TRACE VIDEO DISTRIBUTION

(71) Applicant: Terry Crawford, Atlanta, GA (US)

(72) Inventor: Terry Crawford, Atlanta, GA (US)

(*) Notice: Subject to any disclaimer, the term of this patent is extended or adjusted under 35 U.S.C. 154(b) by 21 days.

(21) Appl. No.: 15/931,243

(22) Filed: May 13, 2020

(65) Prior Publication Data

US 2020/0273496 A1    Aug. 27, 2020

Related U.S. Application Data

(63) Continuation of application No. 15/962,796, filed on Apr. 25, 2018, now abandoned.
(Continued)

(51) Int. Cl.
   *G11B 27/10*     (2006.01)
   *G06F 21/10*     (2013.01)
   (Continued)

(52) U.S. Cl.
   CPC .............. *G11B 27/10* (2013.01); *G06F 21/10* (2013.01); *G11B 20/00144* (2013.01);
   (Continued)

(58) Field of Classification Search
   CPC .............. G11B 27/10; G11B 20/00144; G11B 20/00152; G11B 20/00884; G06F 21/10;
   (Continued)

(56) References Cited

U.S. PATENT DOCUMENTS 9,699,499 B2    7/2017  Besehanic
2003/0033161 A1*  2/2003  Walker ............... G06Q 30/02
                                               705/1.1
(Continued)

FOREIGN PATENT DOCUMENTS

CN    101917611 A    12/2010
CN    104412577 A    3/2015

OTHER PUBLICATIONS

International Preliminary Report on Patentability for corresponding International Patent Application No. PCT/US2018/029413, dated Oct. 29, 2019, 10 pages.
(Continued)

*Primary Examiner* — Thai Q Tran
*Assistant Examiner* — Jose M Mesa
(74) *Attorney, Agent, or Firm* — Ditthavong, Steiner & Mlotkowski

(57) ABSTRACT

An approach is provided for a segment-based viewing of a watermarked recording. The approach involves receiving a request, from an evaluator, to access one of a plurality of media associated with a plurality of interviewees, wherein each of the plurality of media represents a recording of an interview of a corresponding interviewee; and wherein the request relates to evaluation of the corresponding interviewee for admission or hiring. The approach also involves determining source-identifying information associated with the evaluator. The approach further involves determining source-identifying information associated with the request. The approach additionally involves generating a watermark based on the source-identifying information, wherein the watermark is configured to depict an identifier of the evaluator during a presentation of the requested media. The approach further involves modifying the one media to superimpose the watermark on the recording. The approach also involves initiating transmission of the requested media
(Continued)

with the generated watermark to a target device associated with the evaluator.

20 Claims, 11 Drawing Sheets

Related U.S. Application Data

(60) Provisional application No. 62/489,807, filed on Apr. 25, 2017.

(51) Int. Cl.
    *H04N 21/233*     (2011.01)
    *H04N 21/8358*     (2011.01)
    *G11B 20/00*     (2006.01)
    *H04N 21/258*     (2011.01)
    *H04N 21/426*     (2011.01)
    *H04N 21/845*     (2011.01)

(52) U.S. Cl.
    CPC ..... *G11B 20/00152* (2013.01); *H04N 21/233* (2013.01); *H04N 21/25816* (2013.01); *H04N 21/25875* (2013.01); *H04N 21/42684* (2013.01); *H04N 21/8358* (2013.01); *H04N 21/8456* (2013.01); *G06F 2221/0737* (2013.01); *G11B 20/00884* (2013.01)

(58) Field of Classification Search
CPC .......... G06F 2221/0737; H04N 21/233; H04N 21/25816; H04N 21/25875; H04N 21/42684; H04N 21/8358; H04N 21/8456
See application file for complete search history.

(56) References Cited

U.S. PATENT DOCUMENTS

| | | |
|---|---|---|
| 2003/0215110 A1 | 11/2003 | Rhoads et al. |
| 2004/0107347 A1 | 6/2004 | Ogino |
| 2008/0162569 A1* | 7/2008 | Schifone ............ G06Q 10/1053 |
| 2009/0316864 A1 | 12/2009 | Fitzsimmons |
| 2013/0226578 A1* | 8/2013 | Bolton ............... G06Q 10/1057 |
| | | 704/235 |
| 2015/0319490 A1 | 11/2015 | Basehanic |
| 2016/0055457 A1* | 2/2016 | Mather .............. G06Q 10/1053 |
| | | 705/321 |
| 2019/0364312 A1 | 11/2019 | Ramaswamy et al. |

OTHER PUBLICATIONS

Office Action for related Chinese Patent Application No. 201880038358. X, dated Feb. 20, 2021, 16 pages.

\* cited by examiner

METHOD AND SYSTEM FOR WATERMARKING VIDEO MEDIA TO TRACE VIDEO DISTRIBUTION

CROSS-REFERENCE TO RELATED APPLICATION

This application is a continuation of U.S. patent application Ser. No. 15/962,796, filed Apr. 25, 2018, entitled "Method And System For Watermarking Video Media To Trace Video Distribution", which claims priority to U.S. Provisional Patent Application Ser. No. 62/489,807, filed on Apr. 25, 2017, entitled "Method And System For Watermarking Video Media To Trace Video Distribution," the entirety of which is incorporated herein by reference.

FIELD OF THE INVENTION

The present invention relates to recording of sessions (e.g., interview sessions) for network distribution, and more particularly, to the organization and presentation of video recordings of such sessions.

BACKGROUND OF THE INVENTION

The phenomenal growth in the mobility of students and job seekers has increased the demand for the ability to effectively evaluate applicants in a way that partially or wholly obviates the need for real-time meetings, regardless of whether the meetings are in-person or over one or more communication networks. Typical solutions, however, do not provide a cost-effective way of archiving recorded videos of interview sessions for later viewing and evaluation with colleagues when making hiring or admission decisions. In addition, many solutions are not designed to ensure a high quality viewer experience. For example, even if a recorded video loads quickly, the viewer is generally unable to intelligently select portions of the video for playback. Thus, typical solutions lack efficiency with respect to reviewing and evaluating applicants through recorded sessions. Furthermore, today's online world presents countless opportunities for misuse of these recorded videos, e.g., unauthorized or uncontrolled distribution of the recorded videos of a confidential nature, for public consumption.

Therefore, there is a need for a mechanism that provides segment-based viewing of media while minimizes potential unauthorized distribution or other authorized use of such media.

SUMMARY OF THE INVENTION

According to one embodiment, a method comprises receiving a request, from an evaluator, to access one of a plurality of media associated with a plurality of interviewees, wherein each of the plurality of media represents a recording of an interview of a corresponding interviewee, and wherein the request relates to evaluation of the corresponding interviewee for admission or hiring. The method also comprises determining source-identifying information associated with the evaluator. The method further comprises determining source-identifying information associated with the request. The method also comprises generating a watermark based on the source-identifying information, wherein the watermark is configured to depict an identifier of the evaluator during a presentation of the requested media. The method further comprises initiating transmission of the requested media with the generated watermark to a target device associated with the evaluator.

According to another embodiment, an apparatus comprises at least one processor, and at least one memory including computer program code for one or more computer programs, the at least one memory and the computer program code configured to, with the at least one processor, cause, at least in part, the apparatus to receive a request, from an evaluator, to access one of a plurality of media associated with a plurality of interviewees, wherein each of the plurality of media represents a recording of an interview of a corresponding interviewee, and wherein the request relates to evaluation of the corresponding interviewee for admission or hiring. The apparatus is also caused to determine source-identifying information associated with the evaluator. The apparatus is further caused to generate a watermark based on the source-identifying information, wherein the watermark is configured to depict an identifier of the evaluator during a presentation of the requested media. The apparatus is further caused to initiate transmission of the requested media with the generated watermark to a target device associated with the evaluator.

According to another embodiment, a system comprises one or more servers configured to perform at least the following: receive a request, from an evaluator, to access one of a plurality of media associated with a plurality of interviewees, wherein each of the plurality of media represents a recording of an interview of a corresponding interviewee, and wherein the request relates to evaluation of the corresponding interviewee for admission or hiring. The one or more servers are further configured to determine source-identifying information associated with the evaluator; generate a watermark based on the source-identifying information, wherein the watermark is configured to depict an identifier of the evaluator during a presentation of the requested media. The one or more servers are further configured to initiate transmission of the requested media with the generated watermark to a target device associated with the evaluator.

According to another embodiment, an apparatus comprises means for receiving a request, from an evaluator, to access one of a plurality of media associated with a plurality of interviewees, wherein each of the plurality of media represents a recording of an interview of a corresponding interviewee, and wherein the request relates to evaluation of the corresponding interviewee for admission or hiring. The apparatus also comprises means for determining source-identifying information associated with the evaluator. The apparatus further comprises means for generating a watermark based on the source-identifying information, wherein the watermark is configured to depict an identifier of the evaluator during a presentation of the requested media. The apparatus further comprises means for initiating transmission of the requested media with the generated watermark to a target device associated with the evaluator.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Convenience, expense, and other needs are addressed by the present invention, in which an approach is provided for segment-based viewing of a watermarked recording.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF THE PREFERRED EMBODIMENT

Examples of approaches for providing segment-based viewing of a watermarked recording are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
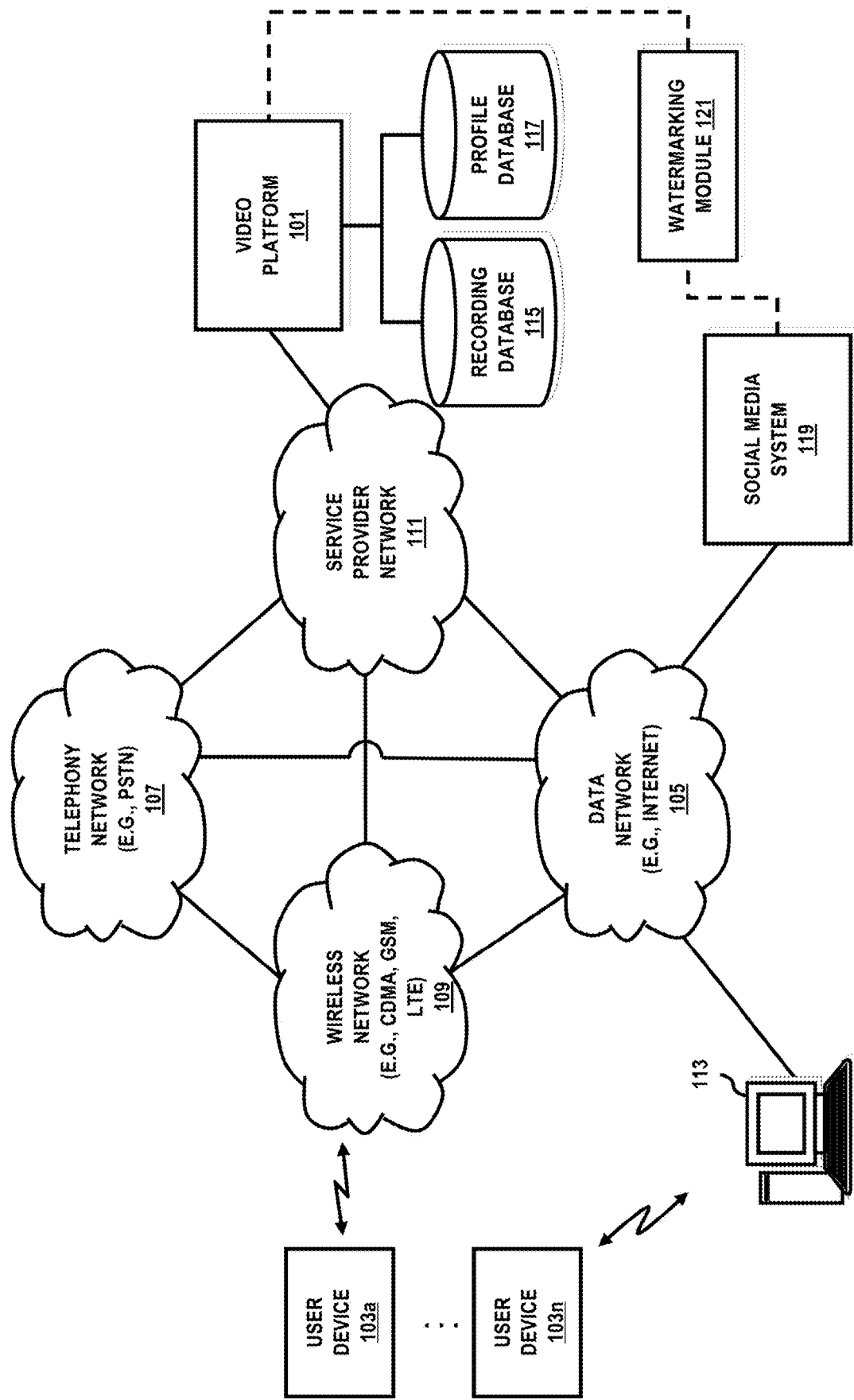
FIGS. 1A and 1B are, respectively, a diagram of a system capable of providing a segment-based viewing of a watermarked recording, and a diagram of the watermarking process performed by the system of FIG. 1A, according to various embodiments.

FIG. 1A is a diagram of a system capable of providing segment-based viewing of a watermarked recording, according to an exemplary embodiment. In one embodiment, a video platform 101 interfaces with a social media system 119, e.g., LinkedIn™, to enable sharing of video media, such as an interview, using the tools and mechanisms of the social media system 119. A concern, however, involves regarding possible misuse of the video media or the uncontrolled distribution of the video media, which may be of a confidential nature. To address this concern, a watermarking module 121 is utilized by the video platform 101 to tag or otherwise identify the source of certain media, such as by placing a watermark on the video with an indicia that indicates the user who is initiating the distribution of the video media. In this manner, the module 121 can attach source-identifying information (e.g., a watermark) to the media, in the event the holder of the media is subsequently distributing it. According to one embodiment, the watermarking module 121 is part of the video platform 101. In another embodiment, the watermarking module 121 can be deployed within the social media system 119, or implemented on the device side (e.g., browser, or client application).

Figure 1B:
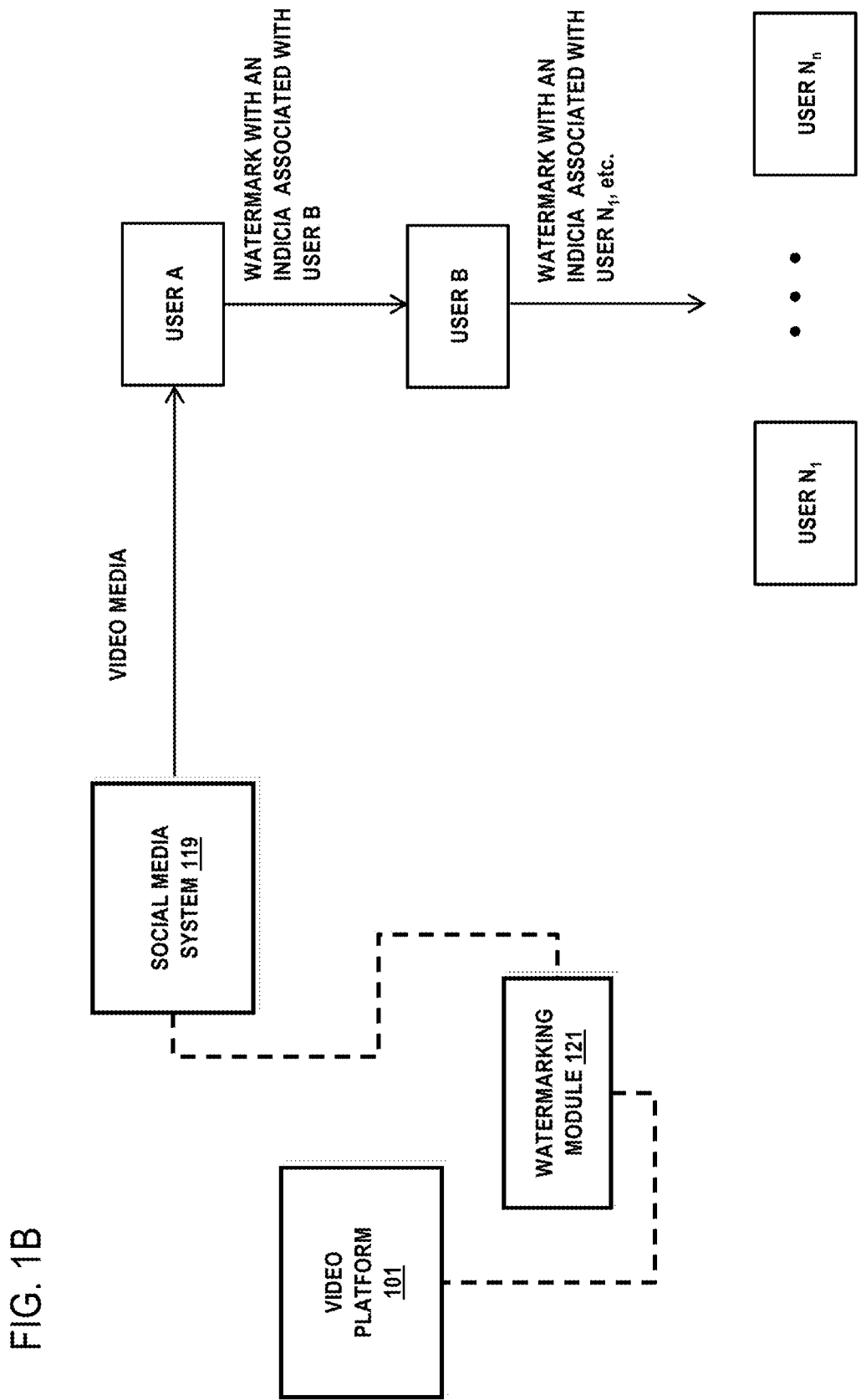

As seen in FIG. 1B, by way of example, a subscriber (user A) of the social media system 119, e.g., LinkedIn™, is more likely to post a video on their LinkedIn™ profile, or share a link to his/her video, if he/she can be assured that the recipient (user B) is not going to post or share the video in a way that embarrasses user A. One way to increase the level of assurance is to superimpose an indicia, e.g., the contact information of user B across the video after user B has logged in to see the video. That is, the video is watermarked by watermarking module 121 with user B's indicia or identifier (e.g., email address, user identifier, telephone number, etc.). In this manner, user B would be dis-incentivized to distribute the video, as such distribution or unauthorized use may be traced back to user B. It is understood, that the devices associated with the Users represent any computing device capable of communicating with the social media system 119; such computing devices include, for example, a smartphone, a tablet, a laptop, a desktop, etc.

Under the above scenario, user A maybe an interviewee and is soliciting the opinion of an evaluator (user B) within the subscriber base of the social media system 119. Because of the integration of the video platform 101 with the social media system 119, user A can simply utilize an existing social media application to share the video of the interview.

According to other embodiments, it is further contemplated that the watermarking module 121 can be configured to create a watermark that includes an indicia of user A solely, or a combination of user A's and user B's.

For the purpose of illustration, the system 100 employs a video platform 101 that is configured to facilitate recording of various communication sessions (e.g., interviews, meetings, etc.), review of the recorded sessions, rating of the recorded sessions, payments for the recorded sessions, etc. One or more user devices (e.g., user devices 103 (or user devices 103a-103n)) may, for instance, be utilized to initiate access to one or more services (e.g., to view recorded interview sessions) over one or more networks (e.g., data network 105, telephony network 107, wireless network 109, service provider network 111, etc.). According to one embodiment, the one or more services may be managed services supplied by a service provider (e.g., a wireless communication company) as a hosted or a subscription-based service made available to users of the user devices 103 through the service provider network 111. As shown, the video platform 101 may be a part of or connected to the service provider network 111. According to another embodiment, the video platform 101 may be included within or connected to the user devices 103, a computing device 113, etc. While specific reference will be made thereto, it is contemplated that the system 100 may embody many forms and include multiple and/or alternative components and facilities. Video platform 101, in some embodiments, can effectively reduce the time needed for evaluators to review recorded interview sessions, enhance collaboration between evaluators, administrators, etc., and decrease overall costs associated with the decision and/or evaluation process.

In certain embodiments, the video platform 101 may include or have access to a recording database 115 and a profile database 117. The recording database 115 may, for instance, include recordings of communication sessions that are uploaded by users, data for determining segments of the communication sessions, etc. The profile database 117 may include account information associated with applicants (or interviewees), interviewers, evaluators, or administrators, rating information assigned by or assigned to the applicants, the interviewers, or the evaluators, etc.

It is noted that the user devices 103 may be any type of mobile or computing terminal including a mobile handset, mobile station, mobile unit, multimedia computer, multimedia tablet, communicator, netbook, Personal Digital Assistants (PDAs), smartphone, media receiver, personal computer, workstation computer, video recorder, television, etc. It is also contemplated that the user devices 103 may support any type of interface for supporting the presentment or exchange of data. In addition, user devices 103 may facilitate various input means for receiving and generating information, including touch screen capability, keyboard and keypad data entry, voice-based input mechanisms, accelerometer (e.g., shaking the user device 103), and the like. Any known and future implementations of user devices 103 are applicable. It is noted that, in certain embodiments, the user devices 103 may be configured to establish peer-to-peer communication sessions with each other using a variety of technologies—i.e., near field communication (NFC), Bluetooth, infrared, etc. Also, connectivity may be provided via a wireless local area network (LAN). By way of example, a group of user devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 103, i.e., IP addresses that are accessible to devices connected to the service provider network 111 as facilitated via a router.

As mentioned, the growth in the mobility of students and job seekers has increased the demand for the ability to effectively evaluate applicants in a way that partially or wholly obviates the need for real-time meetings, regardless of whether the meetings are in-person or over one or more communication networks. Such demand is particularly significant, for instance, when considering communication challenges across time zones. Furthermore, many evaluators (e.g., hiring for an organization, making admission decisions, etc.) want a system that allows for easy collaborative evaluations of their candidates.

Typical solutions, however, do not provide a cost-effective way of systematically archiving video interviews for later viewing and evaluation with colleagues when making hiring or admissions decisions. Moreover, many current solutions are not designed in a way to ensure a high quality viewer experience, and are often fraught with technical issues which make the experience unpleasant for the applicant and less than optimized for the ultimate evaluator. As discussed, the viewer is generally not provided with a way to intelligent select portions of a recording for playback, preventing quick and easy navigation of the recording. However, such navigation is crucial since an individual evaluating tens, hundreds, or even thousands of applicants does not have the time to watch extended video interviews. In addition, many services for producing large volumes of video interviews require that the video interviews follow a particular format with automated questions to enable more efficient evaluations. As such, such services do not allow for unscripted interviews and vibrant exchange between the interviewer and interviewee, and, thus, limit the value of the interviews. Furthermore, the archived video interviews are susceptible to unauthorized use, e.g., misuse or uncontrolled distribution of the archived video interviews of confidential nature allows anyone other than the authorized user to gain access to the sensitive data. In one scenario, an interviewee is more likely to post a video recording in their social media profile, e.g., LinkedIn' profile, if he/she is confident that the recipient of the recording is not going to share the video in a manner that embarrasses the interviewee.

To address this issue, the system 100 of FIG. 1A introduces the capability to provide segment-based viewing of watermarked recorded sessions (e.g., unscripted interviews). It is noted that although various embodiments are described with respect to video recordings of interview sessions, it is contemplated that the approach described herein may be used with other types of recordings and other types of sessions (e.g., audio recording of an interview, video recording of a meeting, etc.). It is noted that although various embodiments are described with respect to watermarking, it is contemplated that the approach described herein may be used with other types of marking (or source-identifying information or indicia) to discourage unauthorized and/or inappropriate usage of one or more recordings. By way of example, when a recording of an unscripted, one-on-one interview session is uploaded to the video platform 101, one or more segments of the interview session may be determined based on the content of the interview session (e.g., the questions asked, the topics discussed, etc., during the interview), and then associated with the recording. Thereafter, when an evaluator or any other users accesses a service associated with the video platform 101 to view the recording, the evaluator or the any other users may be presented with the recording and one or more indicators (e.g., corresponding to the one or more segments) for navigating playback of the recording based on the one or more segments. Furthermore, the presented recording includes a watermark of user information of the user accessing the recording and/or device information of the device accessing the recording. It is also noted that because the system 100 allows for unscripted exchanges during the interview, the value of the interviews may be greatly increased. Specifically, unscripted exchanges enable interviewees to demonstrate their interpersonal skills which are crucial to success in today's dynamic university and professional environments.

In certain embodiments, evaluators (or other users) may be able to assign a rating the recording, the interview session, the interviewee, the interviewer, etc. The rating may be then stored and/or shared to others (e.g., the interviewee, the interviewer, other evaluators, other users, etc.), for instance, to enable the evaluator's evaluations to be compared and reviewed collaboratively with the evaluations of other colleagues. In various embodiments, the cost of evaluating the applicants may be financed by the applicant to decrease the cost to institutions, for instance, conducting the hiring process, the admissions process, etc. In one scenario, applicants may be required to pay for the interview along with other fees when they sign up for the interview.

Figure 2:
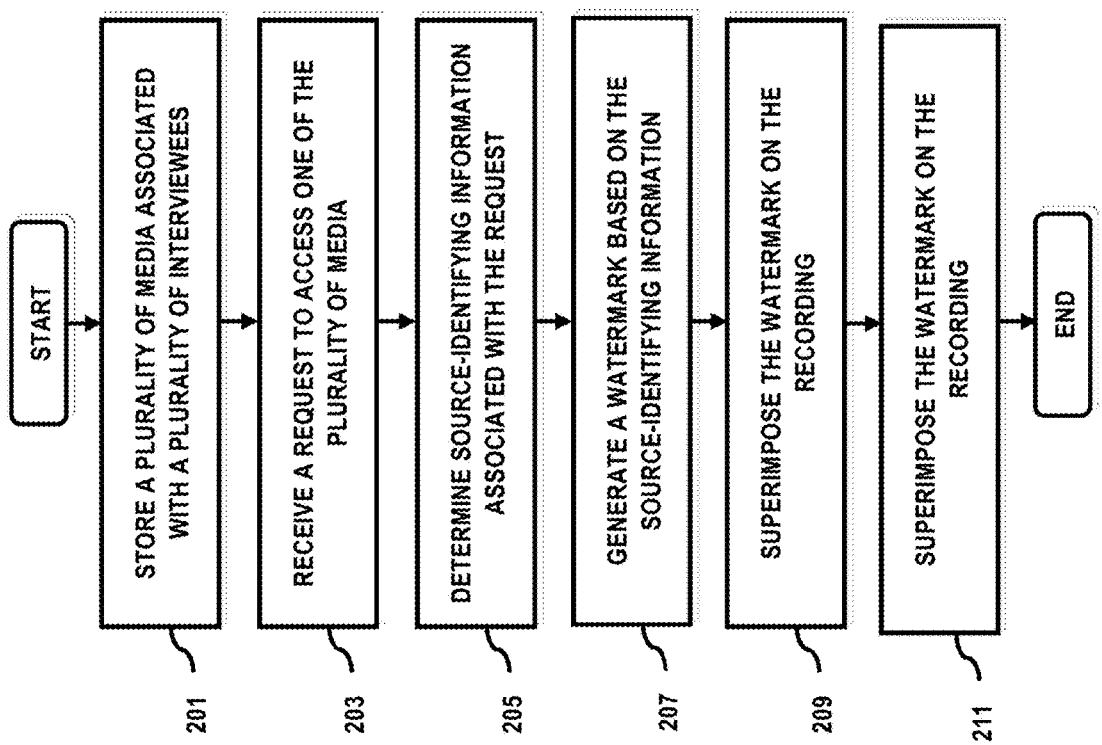
FIG. 2 is a flowchart of a process for providing segment-based viewing of a watermarked recorded session, according to an exemplary embodiment.

FIG. 2 is a flowchart of a process for providing segment-based viewing of a watermarked recorded session, according to an exemplary embodiment. For the purpose of illustration, process 200 is described with respect to FIG. 1A. It is noted that the steps of the process 200 may be performed in any suitable order, as well as combined or separated in any suitable manner.

In step 201, the video platform 101 may store a plurality of media associated with a plurality of interviewees. In one scenario, each of the plurality of media represents a recording of an unscripted interview of a corresponding interviewee. By way of example, when a recorded interview session is uploaded, the video platform 101 may automatically perform audio analysis on the interview video to determine the questions asked, the topics discussed, etc. (e.g., based on the actual language of the interview session). As such, the segments of the communication session may then be identified (e.g., without user intervention) based on the determined questions, topics, etc., of the interview session. Thereafter, the video platform 101 may, associate the one or more segments with a recording of the communication session.

In step 203, the video platform 101 may receive a request to access at least one of the stored plurality of media. In one scenario, the video platform 101 may receive a request from a target device. Thereafter, in step 205, the video platform 101 may determine source-identifying information of the target device. In one scenario, the source-identifying information includes user information about a user associated with the request, e.g., personal information, contact information, and etc. It is contemplated that user information can be any information that can be attributable to the user or designated by the user as a user identifiable parameter, e.g., email address, home address, favorite movie, user ID, passcode, etc. In another scenario, the source-identifying information includes information about the target device, e.g., international mobile equipment identity (IMEI), an electronic serial number, a mobile equipment identity (MEID) or other identifiers unique to the target device.

In step 207, the video platform 101 may generate a watermark based, at least in part, on the source-identifying information. In one embodiment, the video platform 101 may tag or place a watermark on the video with an indicia that indicates the user who is accessing the recording and/or initiating the distribution of the recording. In one scenario, the video platform 101 may convert user information of an interviewee, a user accessing the recording, or a combination thereof into watermark. In another scenario, the video platform 101 may convert device information of the target device into watermark.

In step 209, the video platform 101 may modify the one media to superimpose the watermark on the recording. In one embodiment, the watermark is superimposed, e.g., using a conventional method, on a pre-determined location of the recording.

Subsequently, in step 211, the video platform 101 may initiate transmission of the modified media to the target device. In one embodiment, the transmission of the modified media to the target device is based, at least in part, on authentication of the target device. In one embodiment, the video platform 101 may process target device information based, at least in part, on the request from the target device to access the one media. Then, the video platform 101 may verify predefined values, a preset username and password, user identification, device identification, or a combination thereof associated with the target device, user associated with the request, or a combination thereof. Thereafter, the video platform 101 may associate the one media with the target device. In one scenario, the video platform 101 may present the recording and one or more indicators for navigating playback of the recording based on the one or more segments, wherein the one or more indicators correspond to the one or more segments. In this way, evaluators may effectively and efficiently review recordings of communication session (e.g., unscripted, one-on-one video interviews), for instance, by using the indicators (e.g., tabs, buttons, etc.) to quickly navigate through the recordings (e.g., based on the questions asked, the topics discussed, etc.).

Figure 3:
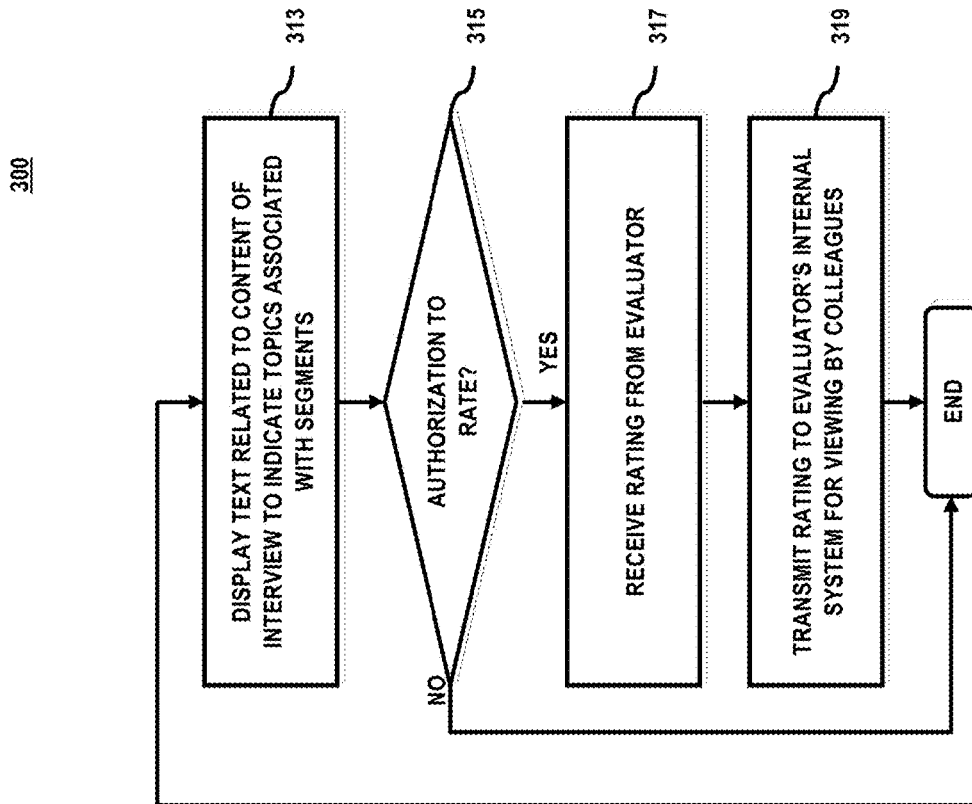
FIG. 3 is a flowchart of a process for collaborative evaluation of applicants using segment-based viewing of a watermarked interview videos, according to an exemplary embodiment.
Figure 3:
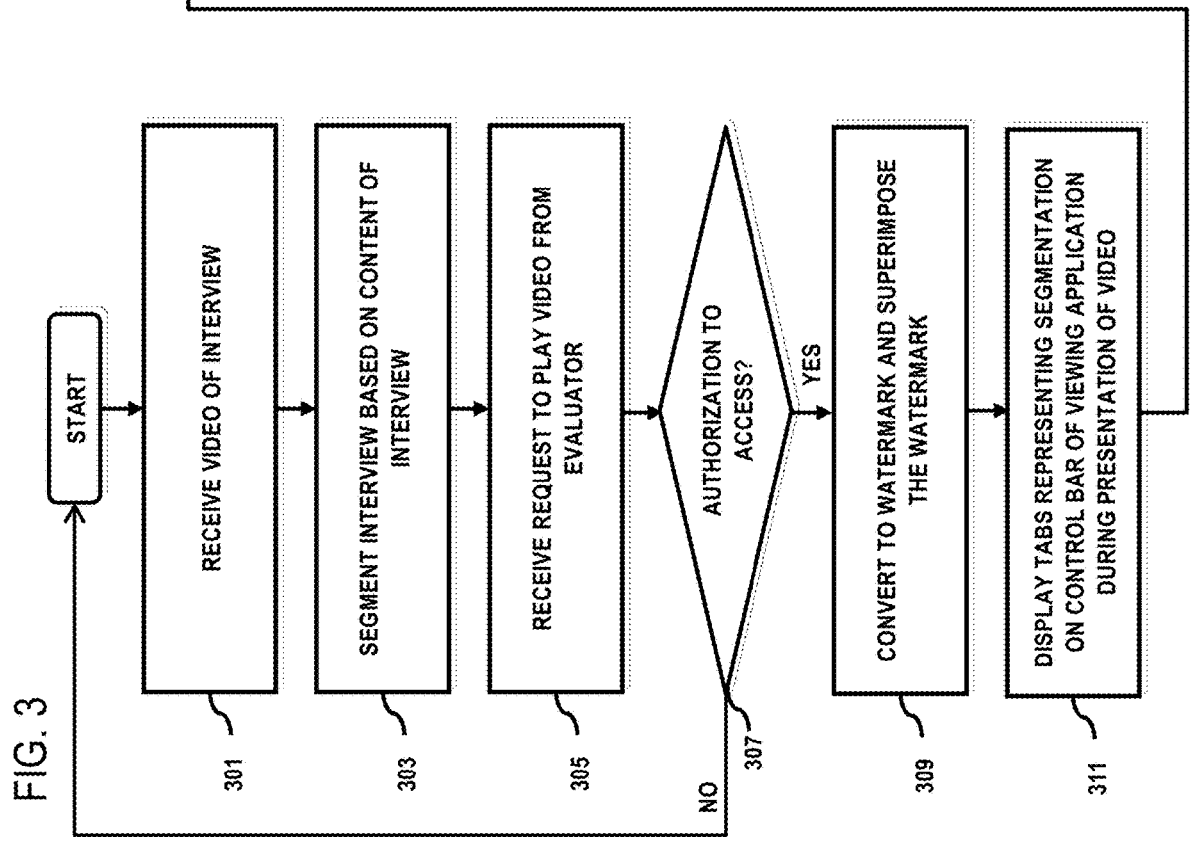

FIG. 3 is a flowchart of a process for collaborative evaluation of applicants using segment-based viewing of a watermarked interview videos, according to an exemplary embodiment. For the purpose of illustration, process 300 is described with respect to FIG. 1A. It is noted that the steps of the process 300 may be performed in any suitable order, as well as combined or separated in any suitable manner.

In step 301, the video platform 101 may receive a recording of an unscripted interview, for instance, from an interviewer. By way of example, the video platform 101 may facilitate an interview session being conducted by a live, trained interviewer who may lead the interview, provide accurate video recording of the interview session, and ensure that the sound and video quality of the video recording is sufficient. After the interview, the interviewer may perform minor editing of the interview video and prepare the video for uploading to the interview video. It is noted that, in some embodiments, the interview video may be uploaded to the video platform 101 in multiple formats (e.g., to ensure compatibility with other platforms and applications, to optimize the viewing experience, etc.). In other embodiments, the video platform 101 may accept the interview video in a number of various formats, and may perform conversions of the interview video to other formats (e.g., to ensure compatibility with other platforms and applications, to optimize the viewing experience, etc.). In one scenario, for instance, the video platform 101 may reorganize the interview video based on the segments of the interview session (e.g., the resulting interview video may follow a particular topic/question order). In another scenario, the uploaded file may be processed to produce multiple versions in various file formats.

The video platform 101 may then, at step 303, facilitate segmentation of the interview session based on content of the interview session, such as the questions asked, the topics discussed, etc. In one embodiment, the video platform 101 may, for instance, perform audio analysis on the received interview video to determine the questions asked, the topics discussed, etc. (e.g., based on the actual language of the interview session).

In step 305, the video platform 101 may receive a request to play the interview video from an evaluator (e.g., the evaluator may access a web-based platform to initiate the request). In response, in step 307, the video platform 101 may verify predefined values, a preset username and password, user identification, device identification, or a combination thereof associated with the device and/or user to authenticate access to the interview video. Upon verification, the video platform 101 may convert device information and/or user information of the device and/or user requesting access to the interview into watermark, step 309. Thereafter, the video platform 101 may superimpose the watermark on the interview video.

In step 311, video platform 101 may present the evaluator with a watermarked interview video (e.g., via a web-based viewing application) along with tabs representing the segmentation of the interview session on a control bar (e.g., the bar indicating the extent to which the video content has been loaded, played, etc.). In one scenario, for instance, clicking on these tabs may enable the evaluator to intelligently navigate to different segments of the interview video (e.g., based on the segmentation of the interview session). In addition, the video platform 101 may also display text related to the content of the interview session in buttons corresponding with the tabs for the purpose of indicating the general topics of each segment. To improve the evaluator's experience, these buttons may, for instance, be presented next to the video to allow the evaluator to quickly navigate between segments (e.g., by clicking on the various buttons), step 313.

In certain embodiments, the evaluator may use a sliding control feature to slide a marker on a number scale to ascribe a rating (e.g., a number rating) to the interview video, the interview session, the interviewee, the interviewer, etc. In further embodiments, authorization based on the evaluator's credentials may be required to ascribe the rating (e.g., the evaluator may be required to provide authorization using her email address and password). As an example, in step 315, the video platform 101 may determine whether the evaluator has authorization to rate the interview video, the interview session, the interviewee, the interviewer, etc.

In step 317, for instance, the video platform 101 may accept a rating from the evaluator if the evaluator is authorized to ascribe such ratings. The video platform 101 may then, at step 319, transmit the rating (and the interview video) to the evaluator's internal system for viewing by the evaluator's colleagues, for instance, to enable additional comments in a collaborative fashion. It is noted that, in various embodiments, the applicant (or the interviewee) may pay for the interview, for instance, when she signs up for the interview. As such, the interviews may be provided at no cost for the institution to which the applicant is applying, and, thus, further increasing the degree to which institutions are receptive to the services offered by the video platform 101.

Figure 4:
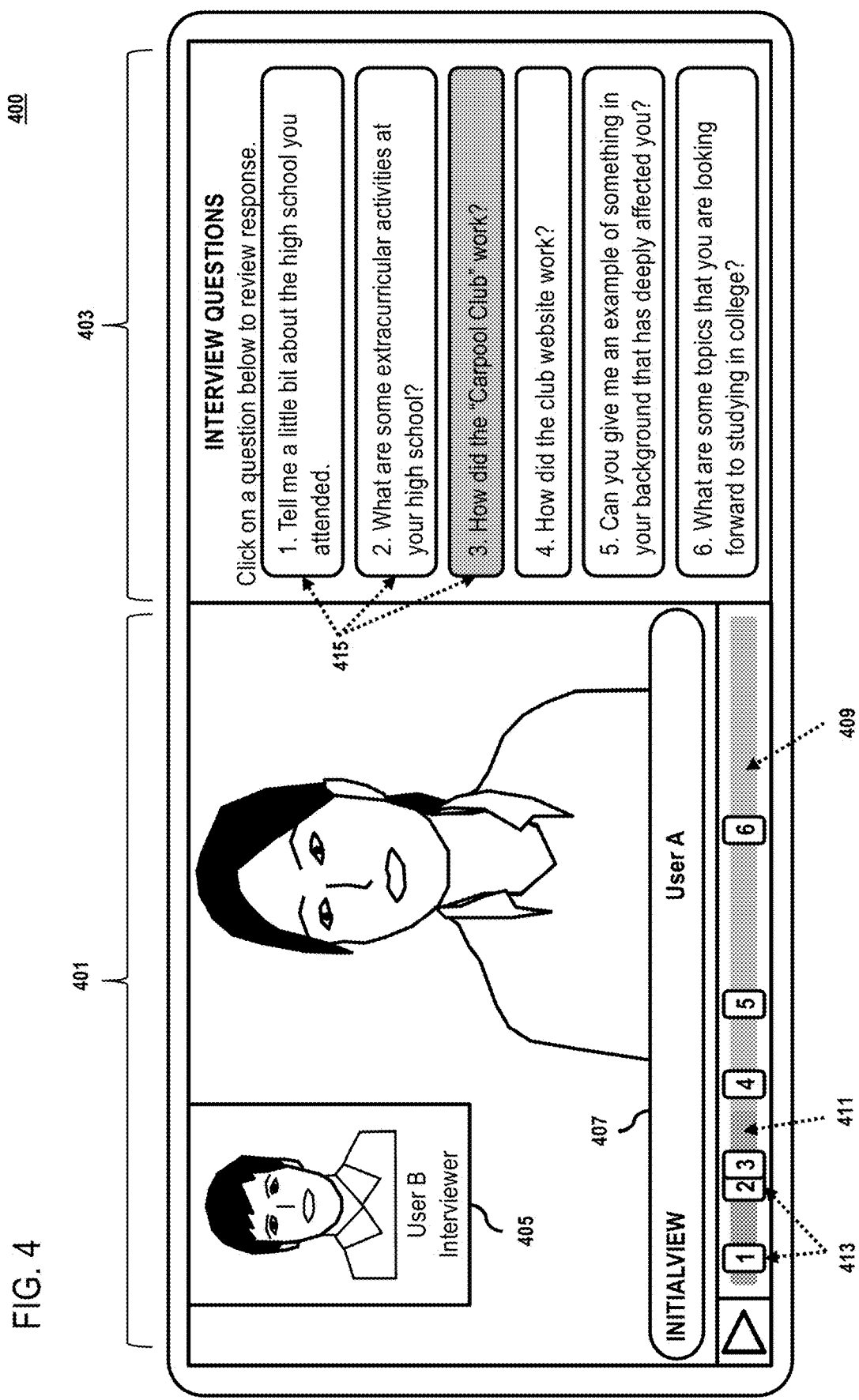
FIG. 4 is a user interface diagram that supports segment-based viewing of a watermarked recorded sessions, according to an exemplary embodiment.

FIG. 4 is a user interface diagram that supports segment-based viewing of a watermarked recorded sessions, according to an exemplary embodiment. As shown, the user interface 400 includes a video section 401 and an interview questions section 403. The video section 401 may, for instance, include a rendering of the recorded interview session of the interviewee (e.g., the applicant), an interviewer window 405 depicting details along with an image of the interviewer and his/her personal information, and an interviewee bar 407 depicting information with respect to the interviewee. In addition, the video section 401 may include a control bar 409 for navigating through the recorded interview session and a load/status indicator (e.g., to indicate the extent that the video has load, the location status of the current video frame, etc.). To enable quicker, more efficient navigation of the recorded interview session, the control bar 409 may, for instance, include one or more tabs 413. As discussed, each of the tabs 413 may correspond to a particular segment of the recorded interview session. As such, clicking on a certain tab 413 may, for instance, cause the user interface 400 to start playing the segment of the recorded interview session associated with the certain tab 413.

Moreover, as illustrated, the interview questions section 403 may include buttons 415. As mentioned, tabs 413 and buttons 415 may correspond to each other. By way of example, the particular button 415 associated with the question "How did the club website work?" may correspond to the tab 413 featuring the number "4." Thus, in one scenario, the user interface 400 may enable the user to cause the user interface 400 to start playing the segment of the recorded interview session associated with the tab 413 featuring the number "4" by clicking on the particular button 415 as another way to enable faster, more efficient navigation of the recorded interview session. Furthermore, as shown, the button 415 associated with the question "How did the 'Carpool Club' work?" is highlighted since the user interface 400 is currently playing the segment associated with the tab 413 featuring the number "3." As a result, the buttons 415 can assist the user in evaluating the answer currently being given by the interviewee.

Figure 5:
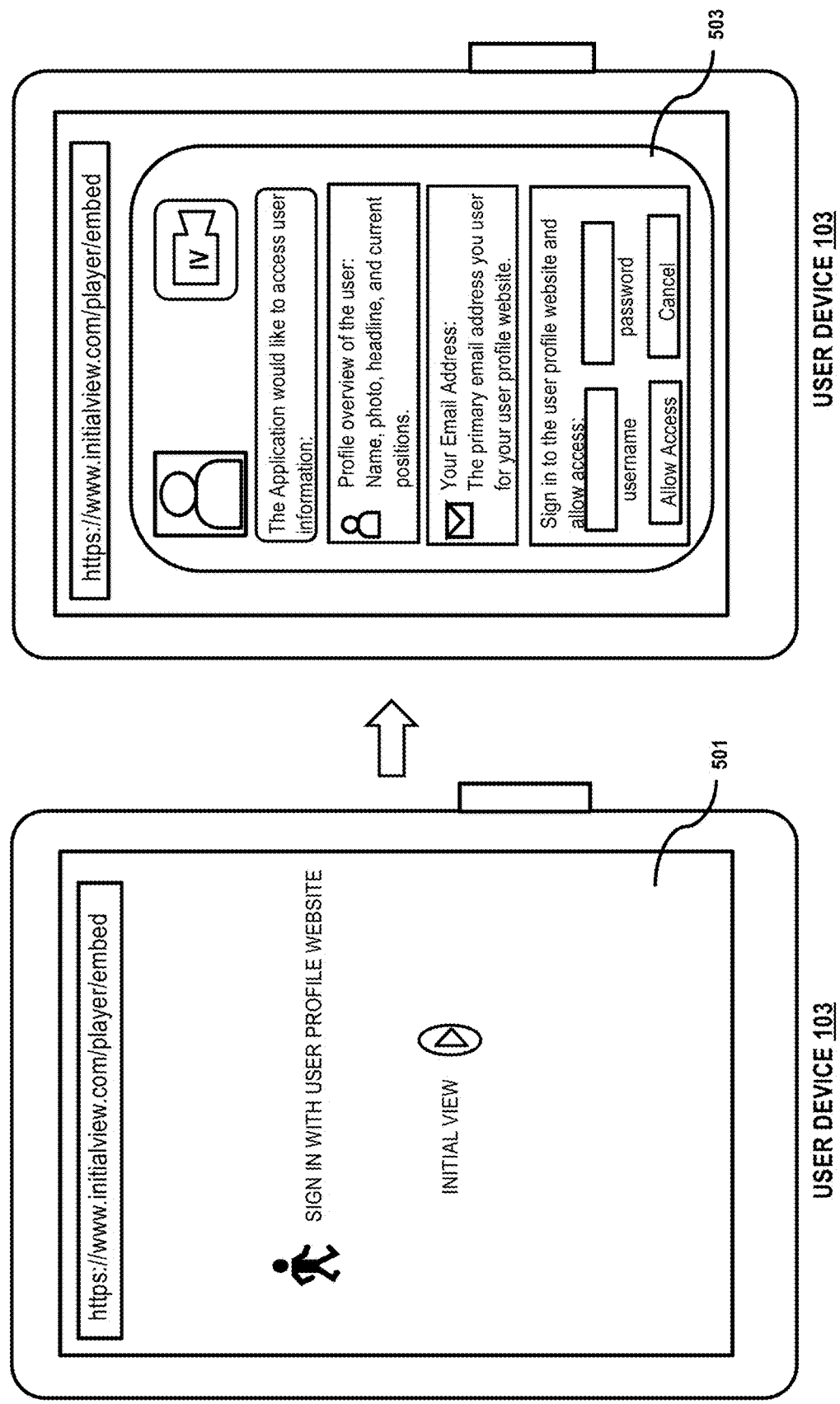
FIGS. 5-7 are user interface diagrams for supporting a segment-based viewing of a watermarked recording, according to an exemplary embodiment.
Figure 6:
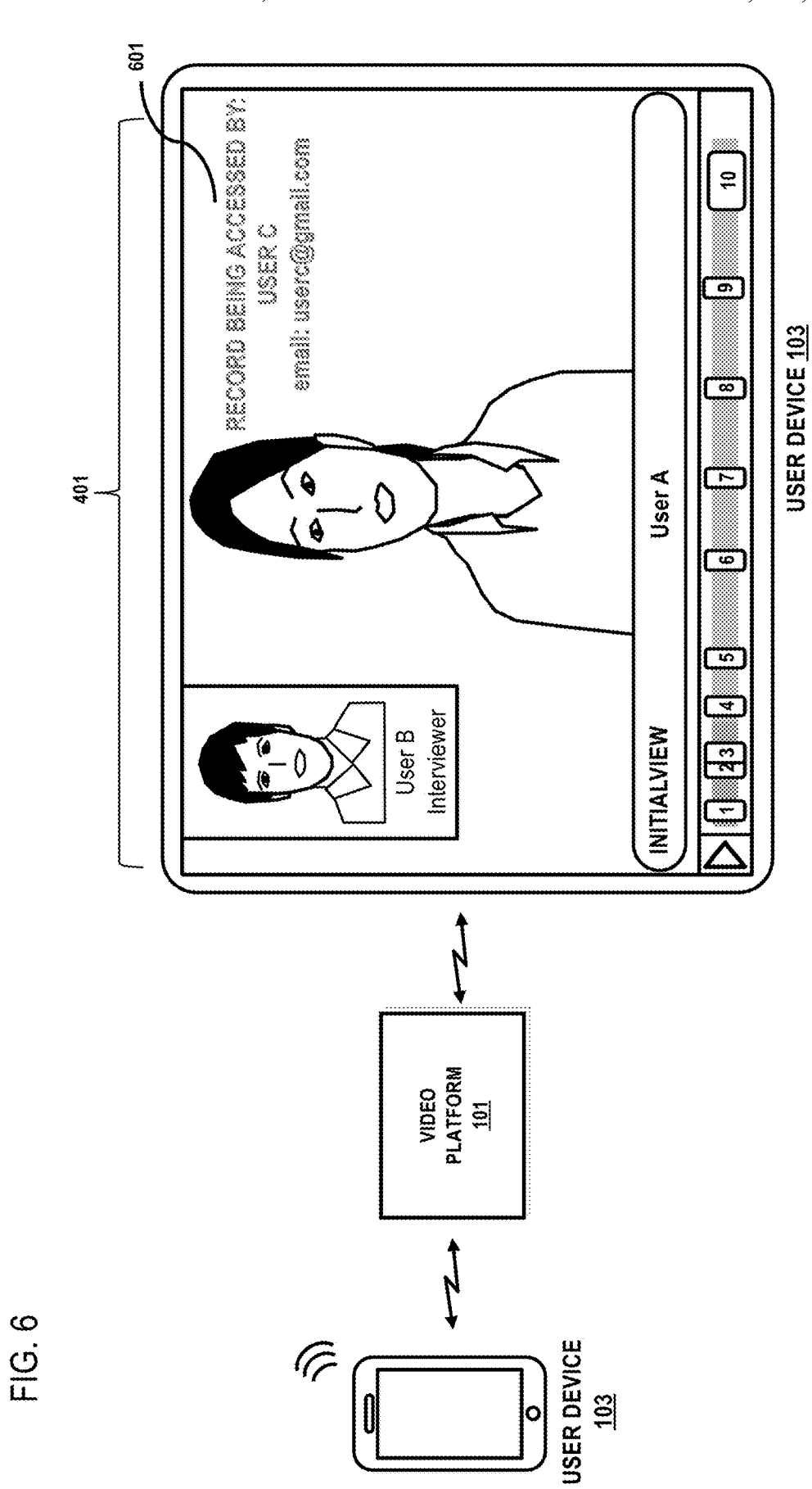
Figure 7:
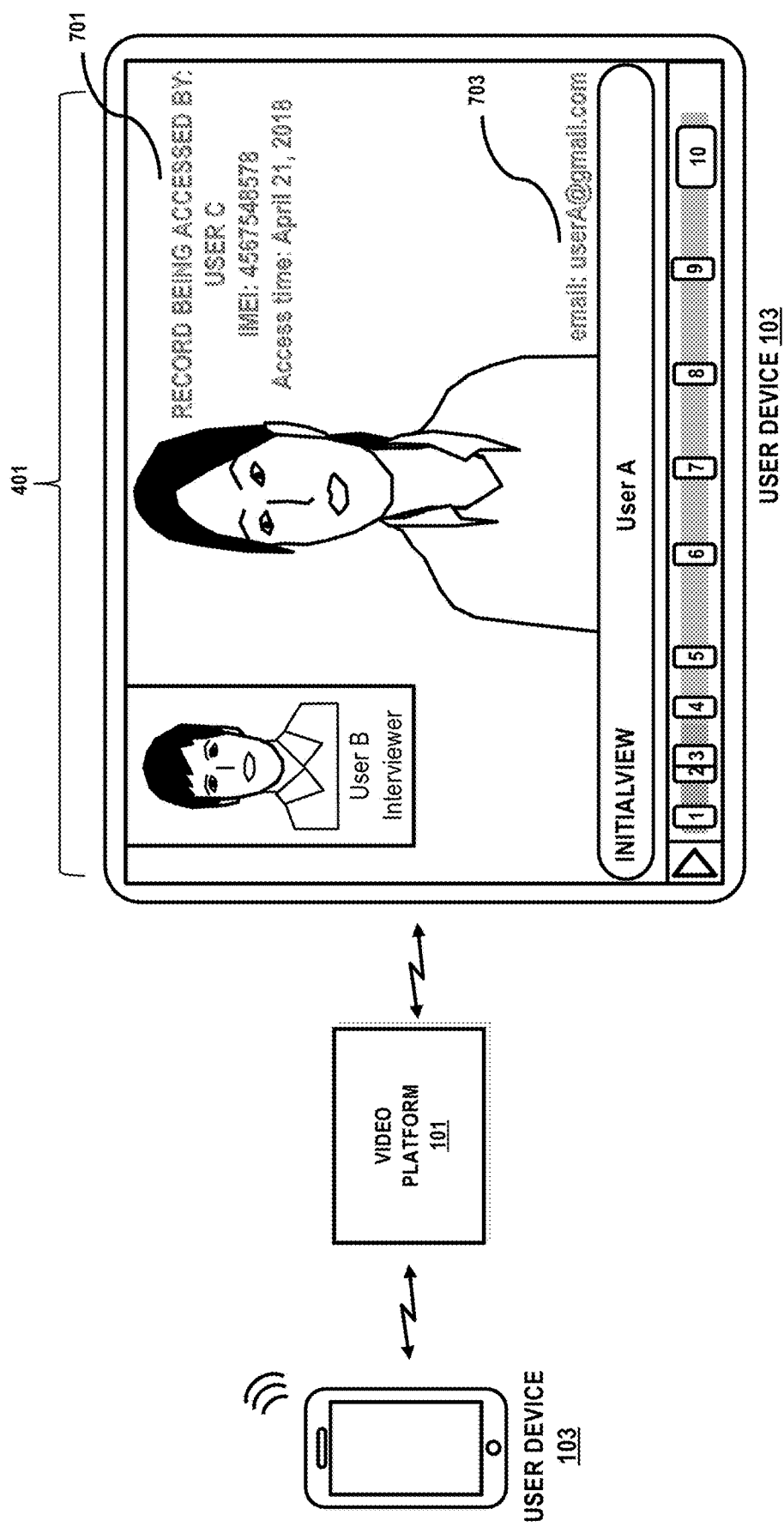

FIGS. 5-7 are user interface diagrams for supporting a segment-based viewing of a watermarked recording, according to an exemplary embodiment. Adverting to FIG. 5, user C is trying to access a recording of an unscripted interview over a social media system. In one scenario, user C is presented with a log-in page 501 to access the stored recording between user A (interviewer) and user B (interviewee). In this scenario, user C may simply access the recording by providing his/her log-in credentials, e.g., username and password, or if user C does not have the log-in credentials, then he/she may register with the service to access the recording. In one scenario, user C is presented with a registration page 503 to enter his/her personal details, e.g., name, address, contact information, to register with the service. Then, the user may select a username and a password for the service. Subsequently, the user may select the option of accessing the stored recording between user A and user B.

Referring to FIG. 6, once user C enters his/her log-in credentials, the video platform 101 may access profile database 117 to verify the credentials entered by user C. Upon verification, the video platform 101 may access recording database 115 to retrieve the requested recording between user A and user B. Thereafter, the video platform 101 may process user information, e.g., personal information or contact information (e.g., email of "userc@gmail.com), of user C and/or device information, e.g., IMEI, an electronic serial number or MEID, of the device used by user C to access the recording. Subsequently, the video platform 101 may select one or more user information or device information for conversion into watermark. Thereafter, the watermark is superimposed on a pre-defined area of the recording. In one embodiment, the video platform 101 may present the video section 401 and/or the interview questions section 403 of the requested recording between user A and user B. For illustrative convenience, in FIG. 6, user C is presented with a full-screen view of the video section 401. The video section 401 of the recording includes a watermark portion 601 of user C's contact information. In another example embodiment, the video platform 101 may superimpose a watermark of contact information of user C with temporal information in the top-right portion 701 and user A in the bottom right corner 703 of the recording, as depicted in FIG. 7. In one scenario, one or more watermark may be superimposed by the video platform 101 based, at least in part, on space availability in the video section 401 of the recording. In another scenario, the video platform 101 may store event information of device 103 accessing the recording in the profile database 117. In a further scenario, the video platform 101 may store event information of user C accessing the recording in the profile database 117.

The processes described herein for a segment-based viewing of a watermarked recording may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
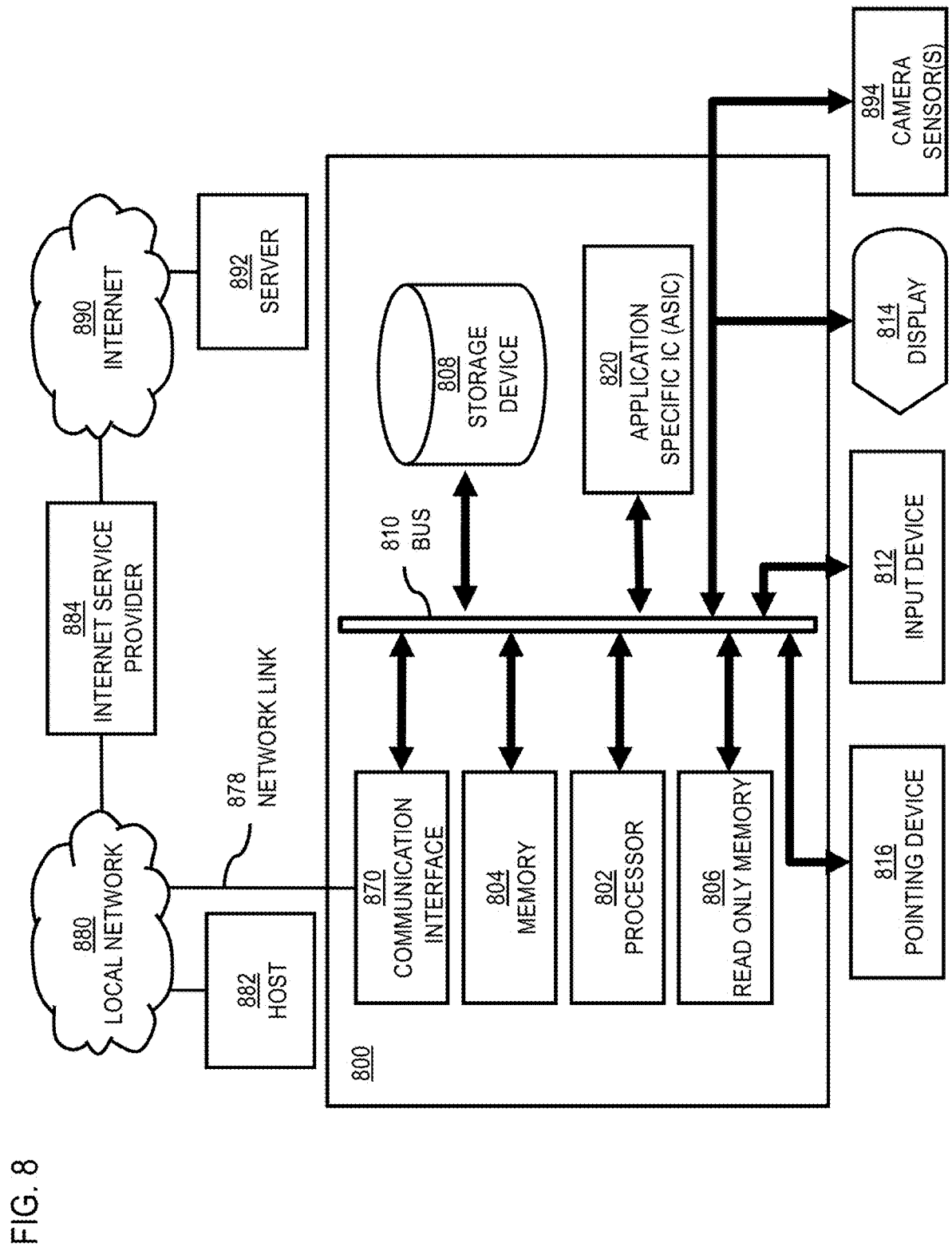
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to a segment-based viewing of a watermarked recording as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of a segment-based viewing of a watermarked recording.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to a segment-based viewing of a watermarked recording. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for a segment-based viewing of a watermarked recording. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for a segment-based viewing of a watermarked recording, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the telephony network 107 for a segment-based viewing of a watermarked recording to the user equipment 103.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
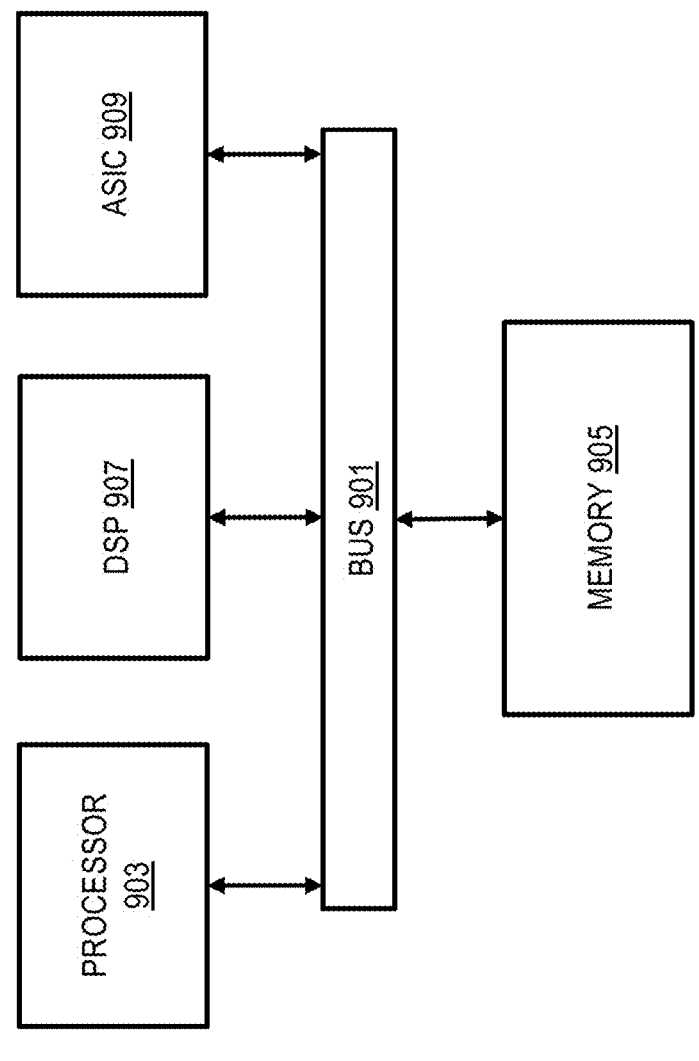
FIG. 9 is a diagram of a chip set that can be used to implement an embodiment of the invention.

FIG. 9 illustrates a chip set or chip 900 upon which an embodiment of the invention may be implemented. Chip set 900 is programmed to a segment-based viewing of a watermarked recording as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of segment-based viewing of a watermarked recording.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to a segment-based viewing of a watermarked recording. The memory 905 also stores the data associated with or generated by the execution of the inventive steps.

Figure 10:
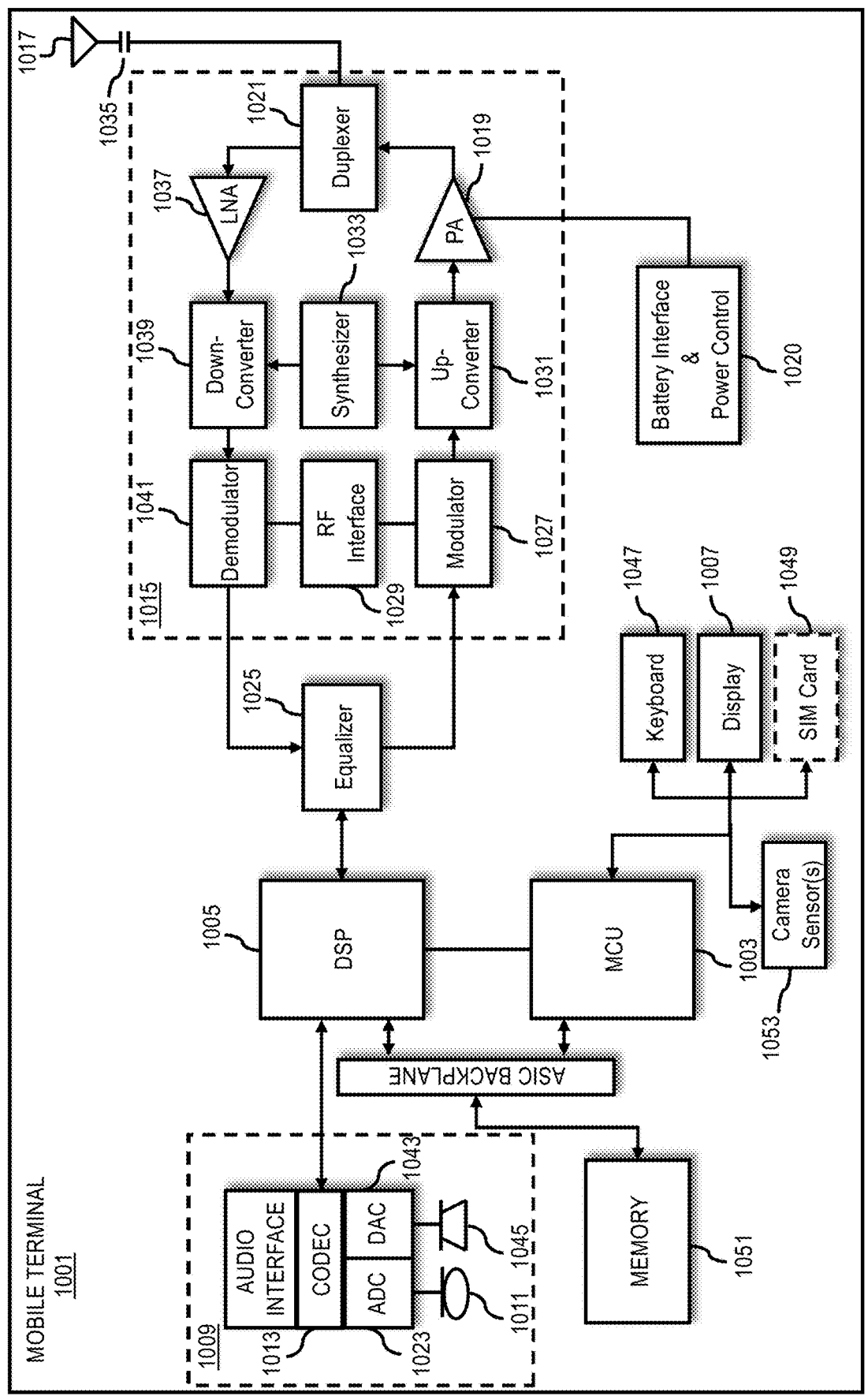
FIG. 10 is a diagram of a mobile station (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of a segment-based viewing of a watermarked recording. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of segment-based viewing of a watermarked recording. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to a segment-based viewing of a watermarked recording. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

Accordingly, an approach is disclosed for providing segment-based viewing of a watermarked recording.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving a request, from an evaluator, to access one of a plurality of media associated with a plurality of interviewees, wherein each of the plurality of media represents a recording of an interview of a corresponding interviewee, and wherein the request relates to evaluation of the corresponding interviewee for admission or hiring;
determining source-identifying information associated with the evaluator;
generating a watermark based on the source-identifying information, wherein the watermark is configured to depict an identifier of the evaluator during a presentation of the requested media; and
initiating transmission of the requested media with the generated watermark to a target device associated with the evaluator.

2. The method of claim 1, wherein the request media includes a plurality of tabs representing correspondingly a plurality of segments of the recording for navigating through the recording, the method further comprising:
receiving, via the target device, rating information about performance of the corresponding interviewee from the evaluator.

3. The method of claim 2, further comprising:
identifying another evaluator of the requested media; and
initiating transmission of the rating information to a different device associated the other evaluator, the different device being different from the target device.

4. The method of claim 2, wherein the interview is an unscripted interview such that the corresponding interviewee has no knowledge of one or more questions posed during the interview, the method further comprising:
performing an audio analysis of the requested media to determine content information, wherein the content information comprises the one or more questions;
determining one or more segments of the requested media based on the content information; and
presenting the requested media, one or more indicators, or a combination thereof to the target device.

5. The method of claim 1, further comprising:
processing target device information based on the request from the target device to access the one media;
verifying predefined values, a preset username and password, user identification, device identification, or a combination thereof associated with the target device, the evaluator associated with the request, or a combination thereof; and
associating the one media with the target device based on the verification.

6. The method of claim 1, wherein the generated watermark includes contact information of the evaluator.

7. The method of claim 1, further comprising:
registering the plurality of interviewees to a service to permit the evaluation of the corresponding interviews for the admission or the hiring by a plurality of institutions.

8. An apparatus comprising:
at least one processor; and
at least one memory including computer program code for one or more programs,
the at least one memory and the computer program code configured to, with the at least one processor, cause the apparatus to perform at least the following,
receive a request, from an evaluator, to access one of a plurality of media associated with a plurality of interviewees, wherein each of the plurality of media represents a recording of an interview of a corresponding interviewee, and wherein the request relates to evaluation of the corresponding interviewee for admission or hiring;
determine source-identifying information associated with the evaluator;
generate a watermark based on the source-identifying information, wherein the watermark is configured to depict an identifier of the evaluator during a presentation of the requested media; and
initiate transmission of the requested media with the generated watermark to a target device associated with the evaluator.

9. The apparatus of claim 8, wherein the request media includes a plurality of tabs representing correspondingly a plurality of segments of the recording for navigating through the recording, the method further comprising:
receiving, via the target device, rating information about performance of the corresponding interviewee from the evaluator.

10. The apparatus of claim 9, wherein the apparatus is further caused to:
identify another evaluator of the requested media; and
initiate transmission of the rating information to a different device associated the other evaluator, the different device being different from the target device.

11. The apparatus of claim 9, wherein the interview is an unscripted interview such that the corresponding interviewee has no knowledge of one or more questions posed during the interview, the apparatus being further caused to:
perform an audio analysis of the requested media to determine content information, wherein the content information comprises the one or more questions;
determine one or more segments of the requested media based on the content information; and
present the requested media, one or more indicators, or a combination thereof to the target device.

12. The apparatus of claim 8, wherein the apparatus is further caused to:
process target device information based on the request from the target device to access the one media;
verify predefined values, a preset username and password, user identification, device identification, or a combination thereof associated with the target device, the evaluator associated with the request, or a combination thereof; and associate the one media with the target device based on the verification.

13. The apparatus of claim 8, wherein the generated watermark includes contact information of the evaluator.

14. The apparatus of claim 8, wherein the apparatus is further caused to:

register the plurality of interviewees to a service to permit the evaluation of the corresponding interviews for the admission or the hiring by a plurality of institutions.

15. A system comprising:

one or more servers configured to perform at least the following, receive a request, from an evaluator, to access one of a plurality of media associated with a plurality of interviewees, wherein each of the plurality of media represents a recording of an interview of a corresponding interviewee, and wherein the request relates to evaluation of the corresponding interviewee for admission or hiring;

determine source-identifying information associated with the evaluator;

generate a watermark based on the source-identifying information, wherein the watermark is configured to depict an identifier of the evaluator during a presentation of the requested media; and initiate transmission of the requested media with the generated watermark to a target device associated with the evaluator.

16. The system of claim 15, wherein the request media includes a plurality of tabs representing correspondingly a plurality of segments of the recording for navigating through the recording, the one or more servers being further configured to perform the following:

receive, via the target device, rating information about performance of the corresponding interviewee from the evaluator.

17. The system of claim 16, wherein the one or more servers are further configured to perform the following:

identify another evaluator of the requested media; and initiate transmission of the rating information to a different device associated the other evaluator, the different device being different from the target device.

18. The system of claim 16, wherein the interview is an unscripted interview such that the corresponding interviewee has no knowledge of one or more questions posed during the interview, the one or more servers being further configured to perform the following:

perform an audio analysis of the requested media to determine content information, wherein the content information comprises the one or more questions;

determine one or more segments of the requested media based on the content information; and present the requested media, one or more indicators, or a combination thereof to the target device.

19. The system of claim 15, wherein the one or more servers are further configured to perform the following:

process target device information based on the request from the target device to access the one media;

verify predefined values, a preset username and password, user identification, device identification, or a combination thereof associated with the target device, the evaluator associated with the request, or a combination thereof; and associate the one media with the target device based on the verification.

20. The system of claim 15, wherein the generated watermark includes contact information of the evaluator, and wherein the one or more servers are further configured to perform the following:

register the plurality of interviewees to a service to permit the evaluation of the corresponding interviews for the admission or the hiring by a plurality of institutions.

* * * * *